(12) United States Patent
Irnich et al.

(10) Patent No.: US 8,737,922 B2
(45) Date of Patent: May 27, 2014

(54) METHOD AND ARRANGEMENT FOR WHITE SPACE ALLOCATION

(75) Inventors: Tim Irnich, Neuss (DE); Jonas Kronander, Uppsala (SE); Joachim Sachs, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 194 days.

(21) Appl. No.: 12/973,325

(22) Filed: Dec. 20, 2010

(65) Prior Publication Data
US 2012/0052891 A1    Mar. 1, 2012

Related U.S. Application Data

(63) Continuation of application No. PCT/SE2010/051370, filed on Dec. 13, 2010.

(60) Provisional application No. 61/378,042, filed on Aug. 30, 2010.

(51) Int. Cl.
*H04B 15/00* (2006.01)

(52) U.S. Cl.
USPC ............ 455/63.1; 455/522; 455/62; 455/450; 455/454; 455/414.1; 455/552; 455/414.2; 455/186.1; 455/501; 455/177.1; 375/132; 375/224; 375/260; 375/240.3; 370/381; 370/462; 370/454; 370/338; 370/351

(58) Field of Classification Search
USPC ............... 455/63.1, 522, 62, 450, 454, 414.1, 455/414.2, 552.1, 177.1, 186.1, 501, 552; 375/132, 224, 260, 240.03; 370/281, 370/462, 454, 338, 351, 278, 280
See application file for complete search history.

(56) References Cited

U.S. PATENT DOCUMENTS

| | | | | |
|---|---|---|---|---|
| 6,138,118 | A * | 10/2000 | Koppstein et al. | 1/1 |
| 2005/0084444 | A1 * | 4/2005 | Domen et al. | 423/594.17 |
| 2008/0153419 | A1 * | 6/2008 | Buris et al. | 455/62 |
| 2008/0268892 | A1 * | 10/2008 | Hamdi et al. | 455/522 |

(Continued)

OTHER PUBLICATIONS

Wang et al. "Feasibility Study of Sensing TV Whitespace with Local Quiet Zone" Oct. 2009, Proceedings of the 2009 IEEE International Conference on Systems, Man, and Cybernetics, San Antonio, TX, USA—Oct. 2009, pp. 2287-2292.*

(Continued)

*Primary Examiner* — Edward F. Urban
*Assistant Examiner* — Ganiyu A Hanidu
(74) *Attorney, Agent, or Firm* — Potomac Patent Group PLLC (57) ABSTRACT

The disclosure relates to a network node of a wireless network, and to a related method of controlling interference generated by at least one white space device controlled by the network node. The method comprises transmitting a request for information regarding channels available for secondary usage to the remote entity, and receiving information from the remote entity, the information indicating a channel available for secondary usage, a critical position associated with said channel, and an interference threshold for the critical position. The method also comprises deriving a constraint for the allocation of said channel to the at least one white space device, based on a position of the at least one white space device, the critical position, and the interference threshold, and allocating said channel and a transmit power to the at least one white space device based on the derived constraint, whereby the interference generated in the critical position by the at least one white space device is kept below the interference threshold.

22 Claims, 7 Drawing Sheets

(56) References Cited

U.S. PATENT DOCUMENTS

| | | | |
|---|---|---|---|
| 2009/0061779 A1* | 3/2009 | Gurney et al. | 455/63.1 |
| 2011/0028170 A1* | 2/2011 | Sawai | 455/501 |
| 2011/0124291 A1* | 5/2011 | Gurney et al. | 455/63.2 |
| 2011/0143761 A1* | 6/2011 | Uusitalo et al. | 455/450 |

OTHER PUBLICATIONS

Maziar Nekovee, "Cognitive Radio Access to TV White Spaces: Spectrum Opportunities, Commercial Applications and Remaining Technology Challenges", New Frontiers in Dynamic Spectrum, 2010 IEEE Symposium on, IEEE, Piscataway, NJ, USA, Apr. 6, 2010, pp. 1-10, XP031664896.

Xin Liu et al., "Sensing-based Opportunistic Channel Access", Mobile Networks and Applications, Kluwer Academic Publishers, vol. 11, No. 4, May 4, 2006, pp. 577-591, XP019404004.

International Search Report mailed on May 10, 2012 in PCT Application No. PCT/SE2010/051370.

* cited by examiner

METHOD AND ARRANGEMENT FOR WHITE SPACE ALLOCATION

TECHNICAL FIELD

The disclosure relates to the field of resource allocation in the context of dynamic spectrum access in cognitive radio. More particularly, the disclosure relates to a network node and a method of controlling interference generated by a white space device controlled by the network node.

BACKGROUND

Spectrum scarcity is a problem that has been observed in regulative frequency allocation charts for some time. All potentially interesting spectrum bands for mobile communication are already allocated to services. However, additional spectrum for mobile broadband is needed to cope with the mobile broadband data exponential take-off. At the same time traditional spectrum regulatory methods are perceived too slow to adapt to the sometimes rapidly changing economic and technical requirements and may thus sometimes be seen as a burden to economical growth and innovation.

For these reasons, investigations into cognitive radio (CR) and secondary (dynamic) spectrum access have been conducted both within the academic research arena but also within the industry. The central idea behind CR, and secondary spectrum access is to use already licensed spectrum for secondary purposes, i.e., for communication between a secondary transmitter and a secondary receiver. However, the secondary usage—sometimes also referred to as white space usage—is required to somehow ensure that a primary service of the entity holding the license for the spectrum is properly protected. The secondary user may also be referred to as a white space device (WSD), which is a device that opportunistically uses spectrum licensed for a primary service on a secondary basis at times and locations where a primary user is not using the spectrum. The WSD is thus not allowed to cause harmful interference to the primary service. Furthermore, the WSD is not protected from interference from any primary service or user.

The known solutions for discovering spectrum opportunities for WSD usage, are mainly focused around three approaches:

1. Geo-location database look-ups: The WSD queries a centrally managed database referred to as the geo-location database containing information regarding channels available for secondary usage, so called white space channels. The WSD provides information regarding its location and possibly also additional information in the database query, and obtains information regarding channels available for secondary usage in the response. The channels available for secondary usage are the channels that the WSD is allowed to use for communication. Furthermore, the WSD obtains maximum allowed transmit power levels associated with the channels available for secondary usage in the response from the database. These levels are based on an estimation of how much interference that would be generated in a worst case, including a margin for aggregated interference from multiple WSD. As a database may have limitations on how often it may be updated, this approach mainly applies to cases where the primary service users are static, such as TV broadcast users. Furthermore, it is expected that WSDs will have to confirm their channel availability information at regular intervals after the initial query. The WSDs interested in using channels available for secondary usage will thus regularly make a new query to the geo-location database, in order to keep the information regarding channel availability updated.
2. Spectrum sensing: The WSD performs spectrum sensing to find out what frequencies it may use for communication, by trying to detect primary transmissions.
3. Sensing enhanced geo-location database look-ups: The geo-location database approach is enhanced by using sensing functionalities in the WSD. The sensing is used to detect mobile primary service users whose usage behavior is not known to the geo-location database, such as program making special events (PMSE) devices.

Technical and operational requirements for operation of CR systems in the white spaces of the frequency band 470-490 MHz, have been suggested in a report from the Electronic Communications Committee (ECC) within the European Conference of Postal and Telecommunications Administrations (CEPT) (CEPT ECC SE43 "TECHNICAL AND OPERATIONAL REQUIREMENTS FOR THE POSSIBLE OPERATION OF COGNITIVE RADIO SYSTEMS IN THE 'WHITE SPACES' OF THE FREQUENCY BAND 470-790 MHZ", Annex 3 to Doc. SE43(10)103). In this version of the report, a master and slave WSD configuration is considered. It is suggested that the master WSD, which may e.g. be a radio access point or more specifically a white space enabled eNB in LTE, is responsible for allocating communication resources to slave WSDs. The slave WSDs are served or controlled by the master WSD, and may e.g. be UEs in a white space enabled LTE system. The allocation of communication resources to slave WSDs should be performed in a way that ensures protection of the incumbent primary service users. However, it is not specified how this is to be performed.

In a publication regarding CR access to TV white spaces for support for home networks, it is disclosed that short range devices may communicate with an access point over white space frequencies. The access point, referred to as a home base station, manages the geo-location database access. The home base station and its associated clients are configured in a master and slave configuration. Since the home base station is connected at the end of a fixed line at a specific postcode address, its geo-location information is known. Based on the geo-location data and specific service requirements, the home base station queries the central geo-location database for channel availability through the fixed-line connection. The database returns information about various operating parameters such as number of channels, centre frequencies and associated power levels for use in that location. As short range indoor scenarios are considered, the maximum transmit power parameter made available in the database is not used. Hence, the disclosed solution is not appropriate for use over a larger service area, such as in cellular systems.

The geo-location database approach currently outlined by CEPT allows the master WSD to perform the geo-location database query. It is also possible for a master WSD to query the database for information regarding channels available for secondary usage for a whole area, possibly specified by a polygon. In case of the master-slave operation, such a possibility of querying for a whole area enables a master WSD to obtain channel availability information for the whole master WSD service area with only one query. The master WSD service area may contain a large number of slave WSDs. In case of a master WSD querying the database for its whole service area, the geo-location database would have to include a margin for aggregated interference from multiple slave WSDs when performing the calculation of permitted maximum transmit power for WSDs. As the geo-location database does not have any information of the specific slave WSD locations or of the actual usage of white space channels by the slave WSDs, the included margin would have to be based on a worst case assumption. Therefore, the allowed transmit powers for slave WSDs obtained from the geo-location database are suboptimal.

SUMMARY

With a suboptimal allocation of transmit power to a slave WSD in the secondary system, the slave WSD may not be able to fully exploit the possibilities it actually would have, given the interference rejection capabilities of the primary system. Furthermore, the master WSD would not be able to adapt the transmit powers of slave devices when e.g. some slaves are switched off or moved to locations more distant from the primary system that needs to be protected.

An object is therefore to address some of the problems and disadvantages outlined above, and to allow a network node to maximize the secondary usage for WSDs while controlling the interference generated in critical positions of a primary system. This object and others are achieved by the method and node according to the independent claims, and by the embodiments according to the dependent claims.

In accordance with a first aspect of embodiments, a method of controlling interference generated by one or more white space devices controlled by the network node is provided. The network node is connected to a remote entity handling information regarding channels available for secondary usage. The method comprises transmitting a request for information regarding channels available for secondary usage to the remote entity, and receiving information from the remote entity. The information indicates a channel available for secondary usage, a critical position associated with the channel, and an interference threshold for the critical position. The method also comprises deriving a constraint for the allocation of the channel to the white space device, based on a position of the white space device, the critical position, and the interference threshold. The method further comprises allocating the channel and a transmit power to the white space device based on the derived constraint, whereby the interference generated in the critical position by the white space device is kept below the interference threshold.

In accordance with a second aspect of embodiments, a network node configured to be used in a wireless network, and to control interference generated by at least one white space device controlled by the network node is provided. The network node is connectable to a remote entity handling information regarding channels available for secondary usage. The network node comprises an output unit adapted to transmit a request for information regarding channels available for secondary usage to the remote entity, and an input unit adapted to receive information from the remote entity. The information indicates a channel available for secondary usage, a critical position associated with the channel, and an interference threshold for the critical position. The network node also comprises a deriving circuit adapted to derive a constraint for the allocation of the channel to the white space device, based on a position of the white space device, the critical position, and the interference threshold. The network node further comprises an allocating circuit adapted to allocate the channel and a transmit power to the at least one white space device based on the derived constraint, whereby the interference generated in the critical position by the white space device is kept below the interference threshold.

An advantage with allowing the network node to control the total aggregated interference generated by the WSDs, is that only WSDs actually transmitting on a white space channel at a given time will be taken into account and that no worst case assumption is needed. The network node may adapt what white space channels and associated transmit powers the WSDs are using for transmission at specific times, and may thus allocate resources in an optimal way while making sure that the interference in the primary service is acceptable, i.e., kept below the specified interference threshold.

Other objects, advantages and novel features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that while the embodiments are primarily described in form of a method and a node, they may also be embodied in a computer program product as well as in a system comprising a computer processor and a memory coupled to the processor, wherein the memory is encoded with one or more programs that may perform the method steps disclosed herein.

Embodiments are described herein by way of reference to particular example scenarios. Particular aspects are described in a non-limiting general context in relation to a primary TV broadcast system and a secondary LTE system. It should though be noted that the embodiments may also be applied to other types of primary and secondary systems such as evolved LTE, UMTS, cdma2000, WiFi, distance measuring equipment for aeronautical navigation purposes and radar systems.

In embodiments of the invention, the problem of a sub-optimized transmit power allocation resulting from the use of transmit power limits received from the geo-location database, is addressed by a solution where a network node controlling the WSDs allocates transmit power and white space channel resources while controlling the aggregated interference generated by the WSDs towards receivers in the primary system.

Embodiments will hereinafter be described with reference to a non-limiting example scenario illustrated in FIG. 1.

The Universal Mobile Telecommunication System (UMTS) is one of the third generation mobile communication technologies designed to succeed the Global System for Mobile communication (GSM). 3GPP Long Term Evolution (LTE) is a project within the $3^{rd}$ Generation Partnership Project (3GPP) to improve the UMTS standard to cope with future requirements. The Universal Terrestrial Radio Access Network (UTRAN) is the radio access network of a UMTS and Evolved UTRAN (E-UTRAN) is the radio access network of an LTE system. In an E-UTRAN, a user equipment (UE) is wirelessly connected to a radio base station (RBS) commonly referred to as an E-UTRAN NodeB (eNB).

Figure 1:
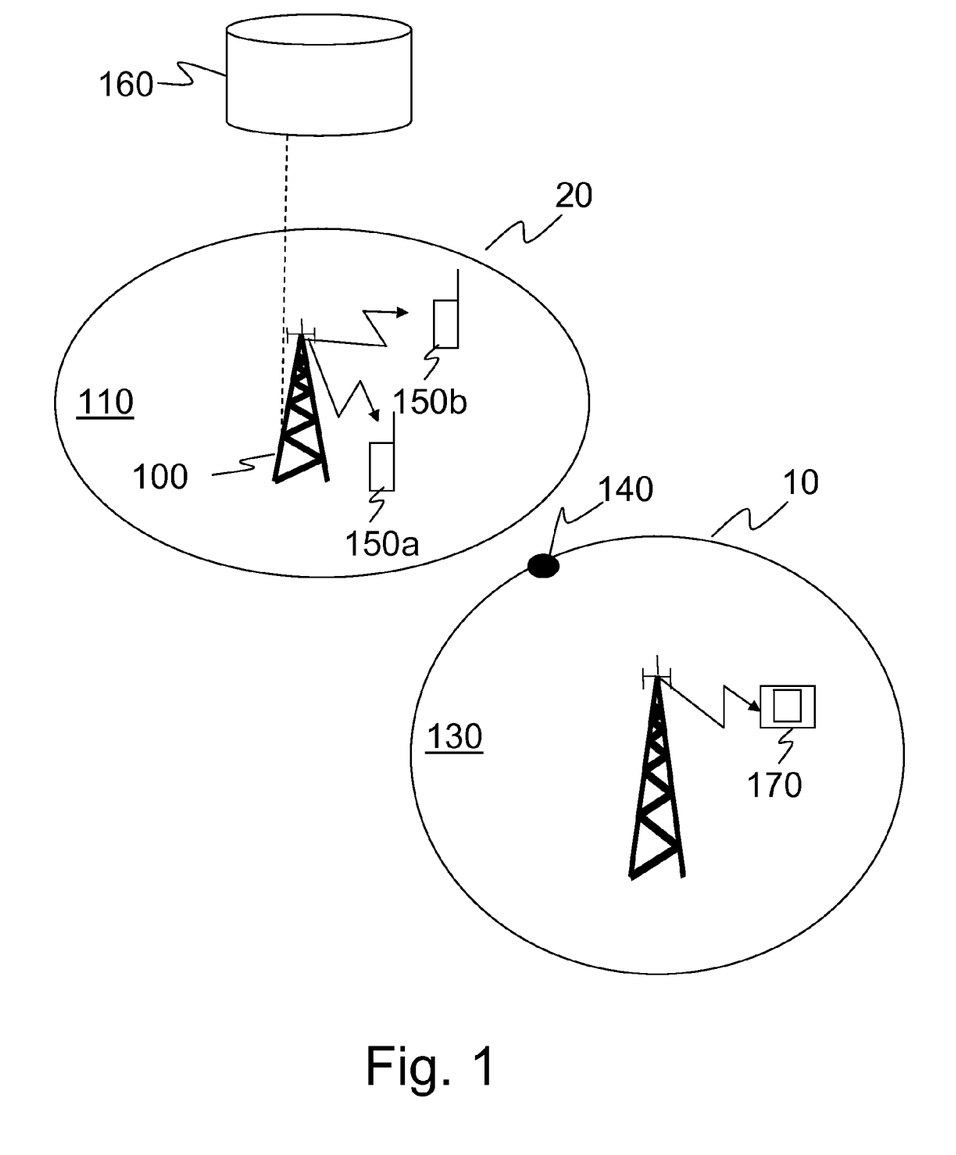
FIG. 1 is a block diagram illustrating a primary and a secondary system wherein embodiments may be implemented.

In FIG. 1, the network node 100 in the secondary system 20 is a master WSD, which in this example scenario is a white space enabled eNB providing a certain service coverage area 110 in an LTE system. In an alternative exemplary embodiment, the master WSD may be a Radio Network Controller (RNC) in a UMTS. The WSDs 150a-b are slave WSDs positioned within the service coverage area 110 of the eNB and are thus served by the eNB. The master WSD/eNB 100 is connected typically via the Internet to a remote entity 160, which is the geo-location database in the example scenario. The primary system is in the example scenario a TV broadcast system 10 providing a TV broadcast service to the primary TV receivers 170 in a certain service area 130.

As the eNB 100 controls the allocation of transmit power resources and white space channel resources to the WSDs 150a-b, it may optimize the resource allocation for its controlled slave WSDs while at the same time ensuring that the interference they generate in the primary system is below an acceptable level. Furthermore, only interference generated by slave WSDs actually transmitting at a given time on a channel will contribute to the instantaneous aggregated interference. The advantage compared to letting the geo-database 160 calculate the transmit power limits of the WSDs, is explained by that, contrary to the eNB, the geo-location database has no information when and on what channels the slave WSDs are transmitting. The geo-location database may only base its calculations on a worst case scenario, where all WSDs 150a-b in the service area 110 are transmitting close to the primary service area 130. A worst-case protection margin referred to as the multiple interference (MI) margin is thus specified by the geo-location database. This leads to an over-protection of critical positions in the primary system, and sub-optimal spectrum utilization by the WSDs. The MI margin may be lowered in embodiments or even completely removed, depending on if there are more secondary white space systems utilizing the white space channels available in the primary system or not.

Figure 2:
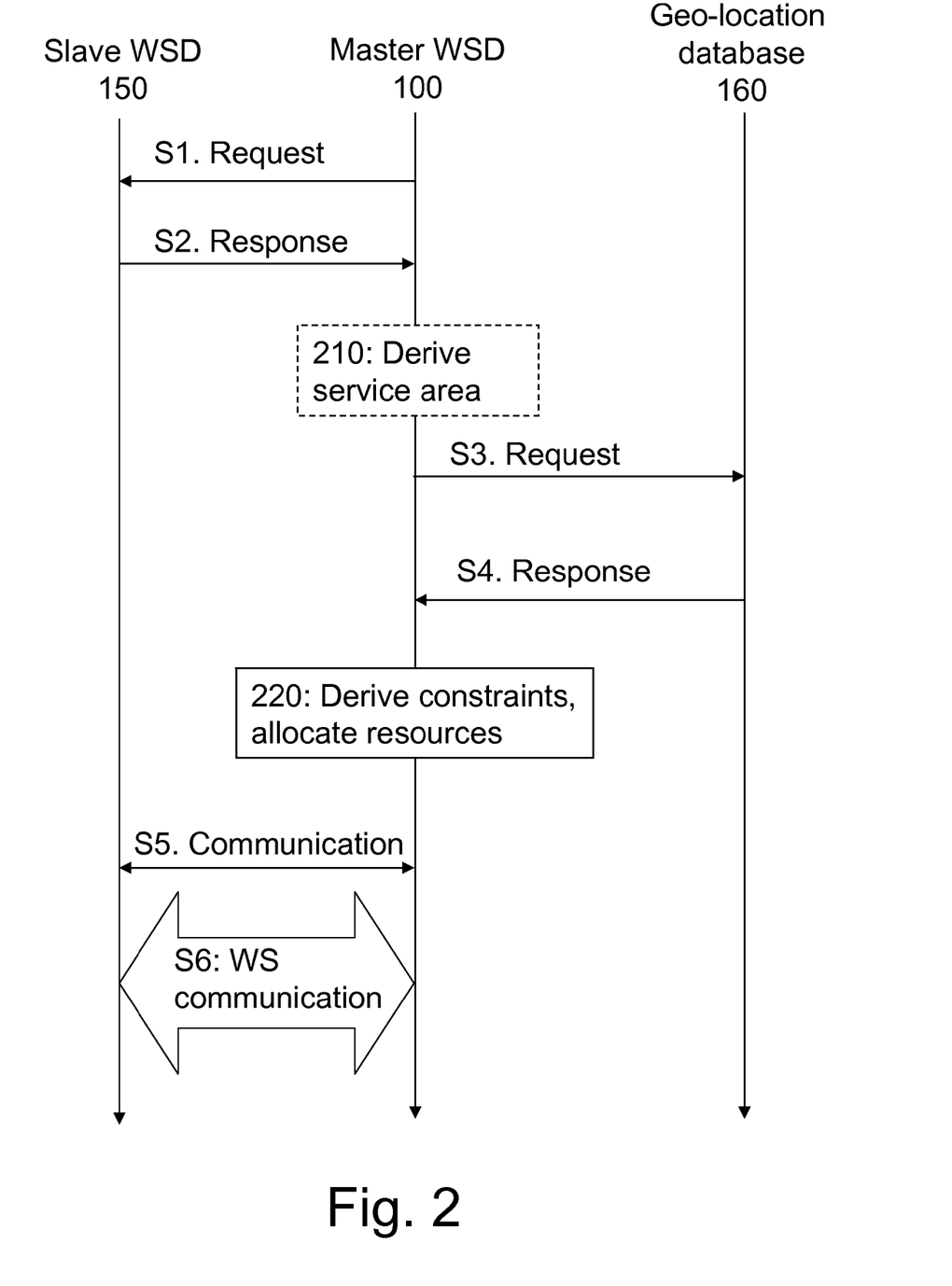
FIG. 2 is a signaling diagram illustrating the procedure according to embodiments.

A signaling diagram for the procedure according to embodiments is illustrated in FIG. 2. The procedure allows efficient resource allocation to slave WSDs 150a-b while protecting receivers 170 in the primary system 10 from interference. At any given time the aggregated interference from all allocated slave WSDs measured at a given location does not exceed the maximum interference that the primary TV receivers 170 may tolerate. The utility the secondary LTE system 20 gets from using a specific channel on a secondary basis is thus optimized.

The queries to the geo-location database 160, i.e. the transmission of the request for information regarding channels available for secondary usage, may be managed by the master WSD 100, which in the example scenario is an eNB, on behalf of connected end user WSDs referred to as slave WSDs 150.

In S1 and S2, the master WSD 100 requests S1 and receives S2 position estimates and an accuracy associated with the positioning estimate from the connected slave WSDs 150. In an alternative embodiment, positioning methods that do not involve the slave WSD are used to retrieve the slave WSD positions and corresponding position accuracy. This may be relevant when the slave WSDs do not support positioning. In still another alternative embodiment, the master WSD may maintain a locally stored position or position estimate of the WSDs, e.g. when the slave WSDs are stationary and localized. Stationary slave WSDs are e.g. customer premises equipment or femto base stations located in a certain building, or relay nodes or repeaters installed at a fixed location.

Based on the information about the position of the slave WSDs 150, the master WSD 100 may derive 210 a service area which may be included in the request to the geo-location database 160.

In S3 the master WSD 100 requests information on the channels available for secondary usage for the service area of the eNB from the geo-location database 160. The service area of the eNB may e.g. be a cell served by the eNB. This signaling S3 may occur before, at the same time or after the query for positioning information to the WSDs in S1 and S2, depending on if the service area is already known by the eNB or not.

In S4, the geo-location database 160 replies, for each channel that is available for secondary usage, with a set of critical positions 140 and associated maximally allowed interference at these critical positions. The reply signal S4 may also contain a validity period of the information provided in the reply. The validity period given in e.g. minutes, hours or days thus indicates when the master WSD needs to query the geo-location database again for information regarding available white space channels, and may be used to set an expiration timer for the information in the master WSD. Whenever the expiration timer has expired, the master WSD may query the database again, to keep the information on available channels and associated maximum transmit power levels updated.

Using the information obtained in the reply S4 from the geo-location database and the positions of the slave WSDs received in S2, the master WSD 100 derives 220 constraints that the power and channel allocation algorithm must respect. The constraints ensure that the total aggregated interference is not larger than the maximally allowed interference at the critical positions. The master WSD 100 then determines an optimal communication resource allocation for the slave WSDs 150 that respects the constraints derived. There are several known methods for how to perform the optimization of the resource allocation. It is for example common practice to use a transmission scheme in uplink that is orthogonal between links, i.e., the interference generated by the uplink communication between a slave WSD 150a and an eNB 100 towards the communication between another slave WSD 150b and the eNB 100 is negligible. Thus the inter link interference in uplink may be disregarded and the resulting rate maximization problem is a convex optimization problem in the power settings of the slave WSDs. Being a convex optimization problem efficient numerical algorithms are publically available to obtain the optimal power allocation.

When the resources are allocated according to the determined optimal resource allocation in 220, the slave WSDs 150 and master WSD 100 performs the needed signaling in S5 for setting up the white space channels according to the determined resource allocation in 220. In S6 the slave and master WSDs transmit user data using the white space channels and the transmit power allocated by the master WSD.

Hereinafter, calculations of the constraints that should be respected when allocating transmit power and channels to the slave WSDs are described according to an example embodiment. Other means of calculating or deriving coefficients of constraints are of course also possible, as well as other means of calculating e.g. path gains.

A position of each slave WSD is needed to derive the constraints, and in one embodiment information about the slave WSD position comprising a position estimation and an associated position accuracy of each slave WSD is obtained from the slave WSD itself. The information for each slave WSD available to the master WSD is thus:

The slave WSD position;

The slave WSD position error in e.g. meters, wherein a lower value corresponds to a better accuracy.

Other ways of obtaining the slave WSD positions and the associated accuracy are to use network based positioning methods, or to obtain positioning information from configuration databases. The configuration databases may e.g. contain the location or address of a slave WSD. Data in such configuration databases may e.g. be entered manually by an installation engineer.

Furthermore in embodiments, the master WSD may also retrieve the following information from each slave WSD:

A slave WSD transmit antenna height;

Slave WSD capabilities such as supported uplink and downlink bands, and supported bandwidths;

This information may be helpful when deriving the constraints for the resource allocation, as will be described later. The transmit antenna height may e.g. be used in a path loss calculation. The slave WSD transmit antenna heights and device capabilities are obtained by requesting and receiving the information from each of the served slave WSDs, in analogy with the position information. This communication may be performed over channels using frequencies that are licensed to the secondary service which in the example scenario is the LTE system frequencies. A dedicated channel or some other reliable channel may be used. Alternatively, the request for slave WSD transmit antenna heights and device capabilities and the corresponding response may be transmitted over a previously set up white space channel.

The master WSD then queries the geo-location database for information on what channels that are available in the region where the served slave WSDs are located, or in the master WSD service area. The slave WSDs may in embodiments be mobile devices in the LTE system. The information provided by the master WSD in the request to the geo-location database may comprise:

The type or types of slave WSDs served. This informs the geo-location database on which parameters to use in the calculation of maximally allowed interference at critical positions.

The service area of the master WSD. The service area may be parameterized as a polygon by indicating a set of points, or as a circle by indicating a center and radius of the circle.

Figure 3:
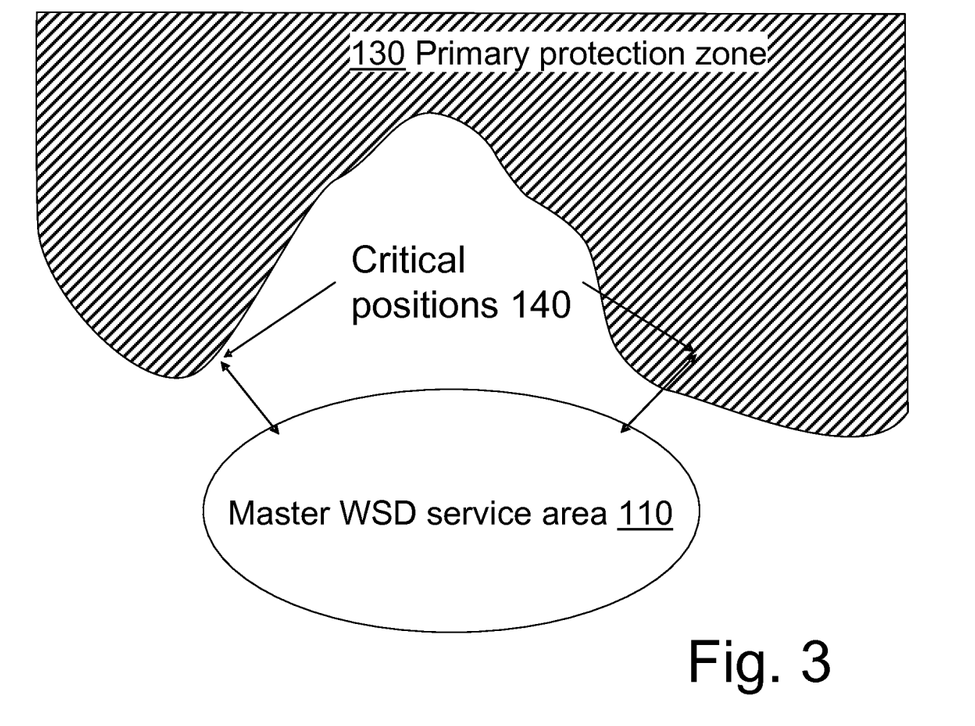
FIG. 3 illustrates two critical positions associated with a primary protection zone and a master WSD service area for a particular channel.

The geo-location database then determines which positions in a primary protection zone or service area that are the critical positions. Examples of a primary protection zone 130 and its critical positions 140 are illustrated in FIG. 3. The critical positions 140 are the positions in the primary protection zone 130 where the risk of interference from slave WSDs is the highest. They may e.g. be the positions that are closest to the secondary service area 110, as in the illustrated example.

The geo-location database replies by sending, for each channel $f_{CR}$ considered as allowed for secondary usage, a list of $N_{critical}(f_{CR})$ critical positions $\vec{r}_i(f_{CR})$, i=1 ... $N_{critical}(f_{CR})$ and corresponding information that allows the master WSD to calculate the maximally allowed Equivalent Isotropic Radiated Power (EIRP) for each slave WSD. The EIRP is a measure that allows comparisons between different emitters regardless of type, size or form. Based on the EIRP and the antenna gain of the slave WSD it is possible to calculate the transmit power.

For each critical position and for each channel, the maximally allowed total interference at the critical position $I_{tot}^{MAX}(f_{CR}, \vec{r}_i(f_{CR}))$ is also provided to the master WSD in the reply from the geo-location database. This maximally allowed total interference may in embodiments be calculated by the geo-location database according to the following equation, hereinafter referred to as eq. [1], using data available in the database and the information provided in the query from the master WSD:

$$I_{tot}^{MAX}(f_{CR}, \vec{r}_i(f_{CR})) = P_{min}^{BS}(f_{BS}) - PR(f_{CR} - f_{BS}) +$$
$$\mu\sigma_{BS} - q\sqrt{(\sigma_{BS}^2 + \sigma_{CR}^2)} - MI - SM + D_{dir} + D_{pol} - G_i + L_f$$

BS indicates the primary receiver, and CR the slave WSD. $P_{min}^{BS}(f_{BS})$ is a minimum primary signal power given in dBm at the primary receiver input at frequency $f_{BS}$, and $PR(f_{CR}-f_{BS})$ is an appropriate primary protection ratio for a frequency offset $f_{CR}-f_{BS}$ given in dB used to protect the primary system reception from slave WSD interference. In situations when the protected signal level is close to a receiver sensitivity, i.e. when the slave WSD operates close to the edge of the broadcasting coverage of the primary system, this protection ratio should also include a margin, of e.g. 3 dB, for taking the receiver sensitivity degradation into account. $\sigma_{BS}$ is a standard deviation of the shadowing between the primary transmitter and the primary receiver, and $\sigma_{CR}$ is a standard deviation of the shadowing between the slave WSD and the primary receiver in dB. $\mu$ is a Gaussian confidence factor related to the target location percentage where the primary coverage is sought, and q is a Gaussian confidence factor related to the target location percentage where the protection is sought. $\mu\sigma_{BS}$ is a shadowing margin in dB related to the variation of the wanted signal at the primary receiver (BS), and $q\sqrt{(\sigma_{BS}^2+\sigma_{CR}^2)}$ is a shadowing margin in dB related to the variation of both the interfering signal from the slave WSD and the wanted primary signal at the location of the primary receiver. MI is the multiple interference margin mentioned previously that takes account of the aggregated interference from multiple co-channel and adjacent channel slave WSDs, below called interferers, operating in a given area at the same time. It has been proposed in prior art that the MI should be around 3-6 dB depending on the number of interferers: an MI of 3 dB corresponds to two interferers, an MI of 5 dB corresponds to three interferers, and an MI of 6 dB corresponds to four interferers. For the case when only slave WSDs connected to a single controlling master WSD are transmitting in the area, the present invention removes the need of this MI margin. In the present invention a non zero MI may be used if several master WSDs are coordinating transmissions, i.e. allocating transmit powers, of several disjoint sets of slave WSDs. SM is a safety margin given in dB that might be set in order to require lower interference allowance from slave WSDs into primary system than what is required from regulators. A range of values (3, 6, 10, 19 dB) may be considered. However, depending on circumstances administrations may consider relaxing this requirement down to 0 dB. $D_{dir}$ is a primary receiver antenna directivity discrimination with respect to the slave WSD signal, and $D_{pol}$ is a primary receiver polarization discrimination with respect to the slave WSD signal in dB. $G_i$ is an isotropic antenna gain and $L_f$ a feeder loss of the primary receiving installation.

Furthermore, also information regarding the assumed receiver antenna height $H_{Primary,i,f_{CR}}$ at the critical position may be provided to the master WSD in the reply from the geo-location database for each channel and each critical position.

Described in another way, the reply from the geo-location database includes the following data:

$$\{f_{CR}, \{\vec{r}_i(f_{CR}), I_{tot}^{MAX}(f_{CR}, \vec{r}_i(f_{CR})), H_{Primary,i,f_{CR}}\}_{i=1}^{N_{critical}(f_{CR})}\}_{\forall f_{CR}} \quad [2]$$

According to the suggestions in the report from the CEPT, the master WSD may calculate the maximally allowed EIRP for each slave WSD by combining the following information:

Data received from the geo-location database, i.e. the set of data in [2] above.

The location $\vec{p}_j$ and associated accuracy $e_{p,j}$ of each slave WSD ($CR_j$), that has been obtained through queries to the slave WSDs or by other positioning methods.

The transmit antenna heights of each slave WSD $H_{WSD,j}$.

A pre-defined path loss model which may possibly be dictated by regulations $L_{CR(H_{WSD})-BS(H_{Primary})}$ ($d_{CR-Primary}$). The path loss model indicates the propagation path loss between the slave WSD transmit antenna with height $H_{WSD,j}$ and a primary receiver antenna with height $H_{Primary}$ at a distance $d_{CR-Primary}$.

To derive the maximally allowed EIRP for each slave WSD ($CR_j$, j=1 ... $N_{slaves}$), each channel $f_{CR}$ and each critical position $\vec{r}_i(f_{CR})$, i=1 ... $N_{critical}$ for the channel, the master WSD may perform the following calculations:

Calculate the distance $d_{ij}$ between the slave WSDs and the critical position $\vec{r}_i(f_{CR})$) using $d_{ij} = |\vec{r}_{CR_j} - \vec{r}_i(f_{CR})| - e_{p,j}$. In this distance calculation the accuracy $e_{p,j}$ of the slave WSD position is included to make a worst case assumption.

Calculate the path loss between slave WSD and the critical positions, using the knowledge of the slave WSD transmit antenna height, the receiver antenna height and the location of the slave WSD, and the specified path loss model.

Calculate the maximum allowed EIRP for the slave WSD that will not cause too much interference at the critical position over the channel $f_{CR}$ according to:

$$P_{ji}^{MAX}(f_{CR}) = L_{CR_j(H_{WSD,j})-BS(H_{Primary,i})}(d_{ij}) + I_{tot}^{MAX}(f_{CR}, \vec{r}_i(f_{CR})) \quad [3]$$

For each slave WSD and channel $f_{CR}$ the master WSD then decides the maximally allowed EIRP to be:

$$P_j^{MAX}(f_{CR}) = \min_{i=1 ... N_{critical}(f_{CR})} P_{ji}^{MAX}(f_{CR}) \quad [4]$$

i.e. the maximally allowed EIRP for the slave WSD if it would use channel $f_{CR}$ for transmissions. The set of $P_j^{MAX}(f_{CR})$ for each j and $f_{CR}$ may then be used as constraints in the power allocation optimization.

In the process of managing the slave WSD resource allocation, the master WSD may set the transmit power for a slave WSD to zero (i.e., $-\infty$ dBm) when it is not allocated a white space channel. Furthermore, some channels may not be allowed at all for secondary access. One example is e.g. that if the service area 110 of the master WSD 100 is inside the primary service area 130 of the TV transmitter, this will be indicated by the geo-location database to the master WSD by not listing the channel as available for secondary usage, and the corresponding EIRP threshold may then be set to zero (i.e., $-\infty$ dBm) for all slave WSDs. Also the capabilities of each slave WSD may dictate that some of the channels are not possible to use for transmission due to e.g. hardware limitations, and for these slave WSDs and channels the respective maximal transmit power is set to zero (i.e., $-\infty$ dBm). The slave WSD capability is information that the master WSD may have obtained in a previous query to the slave WSD, as already described above.

The transmit power or EIRP limits are input into the system resource allocation mechanisms, i.e. into the optimization procedure, as constraints to find an effective and preferably optimal power and channel allocation, which may e.g. aim at a maximized total rate of the system. Regardless of the used power allocation algorithm, the algorithm must thus respect the constraints:

$$P_j(f_{CR}) \leq P_j^{MAX}(f_{CR}), j=1 ... N_{slaves}, \forall f_{CR} \quad [5]$$

Where $N_{slaves}$ denotes the number of slave WSDs served by the master WSD. These constraints make sure that the interference caused at any critical location is kept below the interference threshold. There are several known examples of a power and channel allocation algorithm that may be used, where the algorithm takes constraints for individual channels and individual transmitters into account.

However, instead of simply using the maximally allowed total interference in a critical position derived from eq. [1] in order to calculate the maximally allowed EIRP for one slave WSD for each white space channel, it is possible to ensure that the total aggregated interference in the critical position from all slave WSDs transmitting in the channel stays below the maximally allowed total interference level. In other words the following constraints are to be respected by the transmit power and channel allocation procedure in the secondary LTE system:

$$10\log_{10} \sum_{j=1}^{N_{slaves}} 10^{X/10} \leq I_{tot}^{MAX}(f_{CR}, \vec{r}_i(f_{CR})), \forall f_{CR}, \quad [6]$$

$$i = 1 ... N_{critical}(f_{CR})$$

where X is the interference caused by the slave WSD in the critical position. One possible non-limiting way of calculating the interference X is:

$$P_j(f_{CR}) - L_{CR_j(H_{WSD,j})-BS(H_{Primary,i})}(d_{ij}) \quad [7]$$

In [6] and [7], the power, the maximally allowed total interference, and the path loss are given in logarithmic units, i.e. in dBm, dBm and dB respectively. The constraints in [6] thus replace the constraints given in [5] in the system power and channel allocation procedure. An example of how to find optimal power allocations for the slave WSDs—optimal in the sense that it maximizes the sum rate in the secondary system—when this type of constraints are imposed and when the inter link interference in uplink may be disregarded as is the case in standard orthogonal uplink transmission schemes, is to note that the problem is a convex optimization problem and hence the optimal power allocation may be obtained by use of efficient numerical algorithms that are publicly available.

The described approach of using the constraints in [6] when allocating resources to the slave WSDs, takes the actual transmit power used by the slave WSDs into account to ensure that the total aggregated interference is accurately controlled. This approach implies that the MI margin may be set to zero, or at least lowered in the calculation of the total allowed aggregated interference level in eq. [1]. This allows for a higher total transmit power to allocate to slave WSDs, without reducing the level of protection of the primary system.

Particular embodiments of the invention have the following advantages:

- It removes some of the computational burden from the geo-location database compared to if the transmit power allocation is performed in the geo-location database. Only thresholds for aggregated interference at critical positions are calculated by the geo-location database and not the maximal transmit power. In particular, the geo-location database does not have to calculate the path gains from all WSDs to the respective critical position.
- It makes an optimization of the resource usage in terms of channel and power allocation possible. The optimization is such that it ensures that the aggregated interference generated by slave WSDs is always kept below the required interference thresholds at critical locations. The master WSD is in a better position than the geo-location database to determine the optimal power allocation respecting the interference constraint, as it already has a great part of the necessary information.
- It reduces the amount of queries that need to be sent to the geo-location database, as only one query is needed per cell. This reduces the load on the geo-location database. Only one query to the geo-location database is required to derive the constraints for the power allocation optimization for the slave WSDs.

Figure 4A:
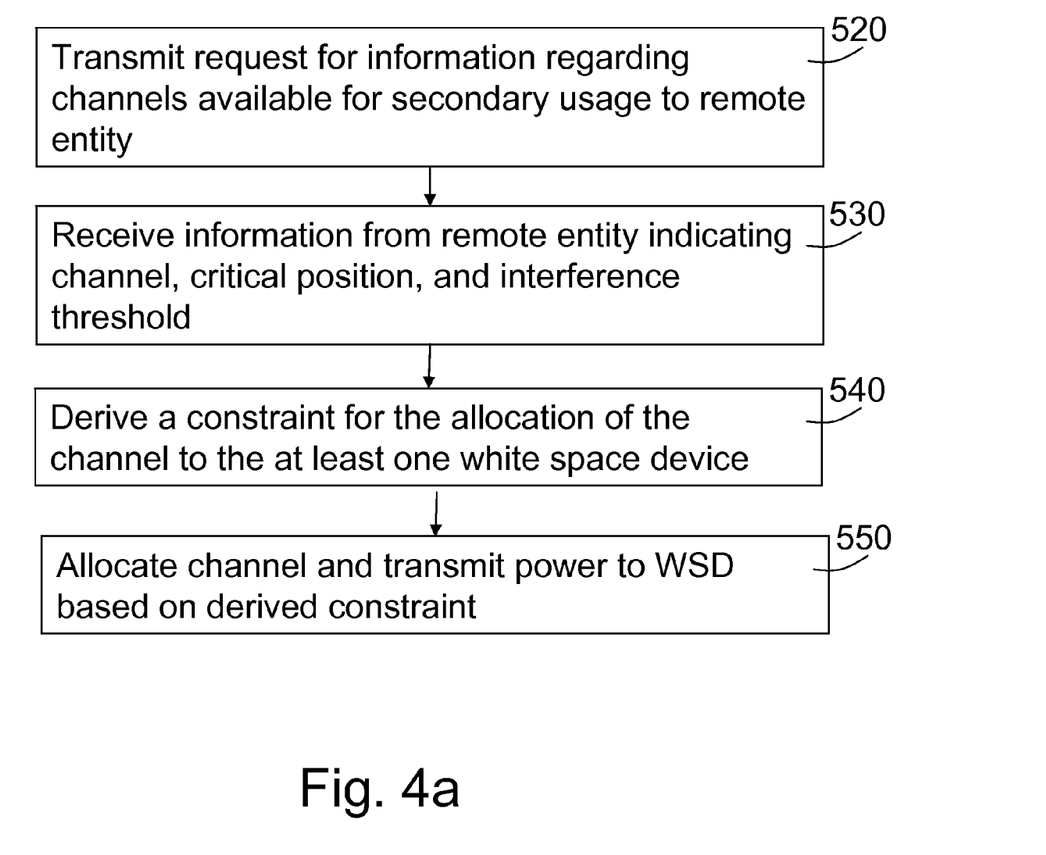
FIGS. 4a-4b are flowcharts of the method performed by the network node according to embodiments.

FIG. 4a is a flowchart of the method in the network node of controlling interference generated by one or more WSDs controlled by the network node, according to embodiments. The network node is in one embodiment a master WSD, and the WSDs are thus slave WSDs. The network node may e.g. be an eNB in LTE. The network node is connected e.g. via the Internet to a remote entity handling information regarding channels available for secondary usage. In one embodiment, the remote entity is a geo-location database. The method comprises:

- 520: Transmitting a request for information regarding channels available for secondary usage to the remote entity.
- 530: Receiving information from the remote entity. The information indicates a channel available for secondary usage, a critical position associated with the channel, and an interference threshold for the critical position. There may be more than one channel, and more than one critical position for each channel and to each critical position an associated interference threshold.
- 540: Deriving a constraint for the allocation of the channel to the WSD, based on a position of the WSD, the critical position, and the interference threshold. The constraint comprises in one embodiment a transmit power constraint. The position of the WSD is in one embodiment obtained from the WSD. Alternatively, the position may be obtained from a memory in the network node, or through a network based positioning method.
- 550: Allocating the channel and a transmit power to the WSD based on the derived constraint, whereby the interference generated in the critical position by the WSD is kept below the interference threshold.

Figure 4B:
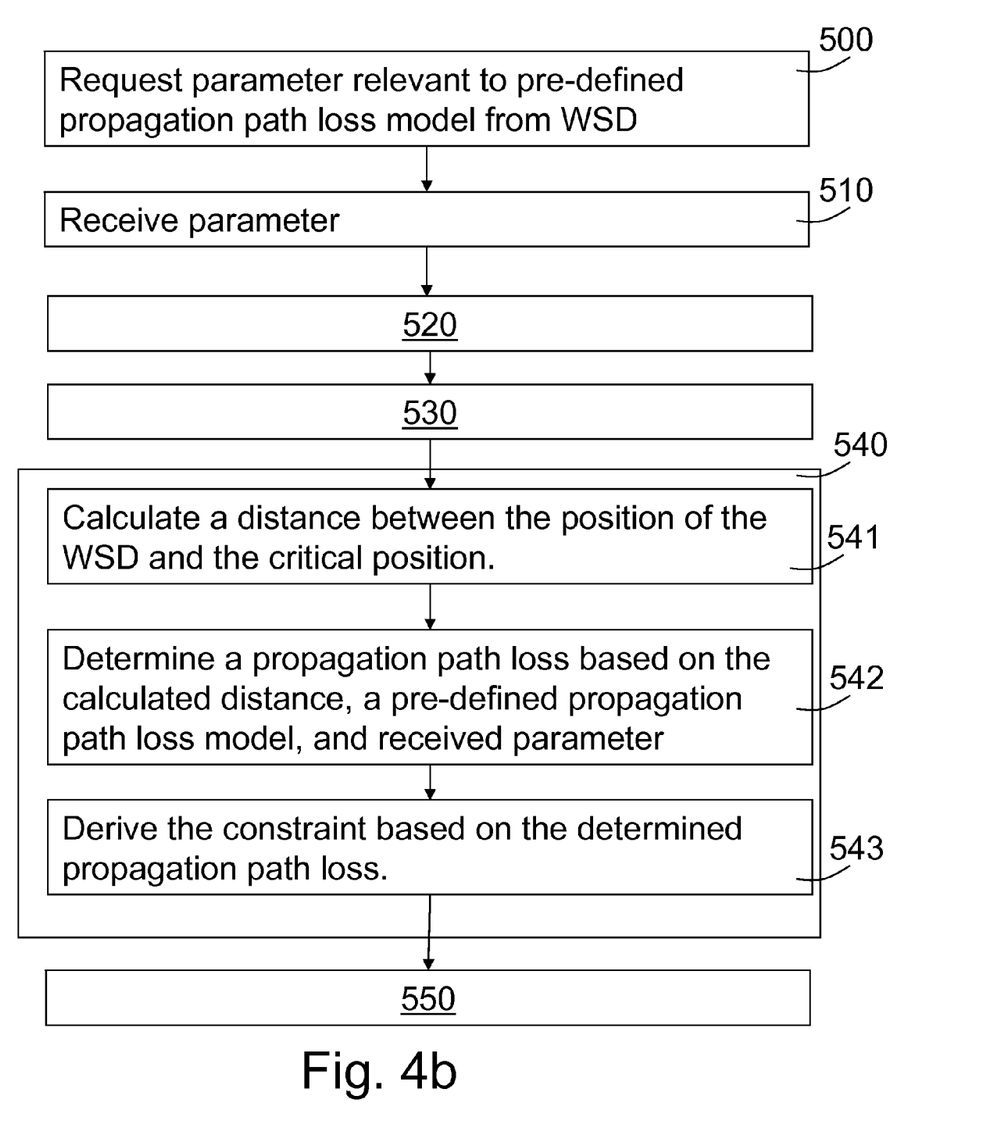

FIG. 4b is a flowchart of the method in the network node according to other embodiments. The method comprises the initial steps of requesting 500 and receiving 510 one or more parameters relevant to a pre-defined propagation path loss model from the WSD. The model may be used to calculate the propagation path loss from the WSD to a primary receiver located at a critical position. The method also comprises the steps 520 and 530 described above. The step 540 of deriving a constraint for the allocation of the channel to the WSD comprises:

- 541: Calculating a distance between the position of the WSD and the critical position.
- 542: Determining a propagation path loss based on the calculated distance, the parameters relevant to the pre-defined propagation path loss model received in step 510, and a pre-defined propagation path loss model.
- 543: Deriving the constraint based on the determined propagation path loss, and the interference threshold.

In one embodiment, the received parameter is a transmit antenna height of the WSD. The determined propagation path loss is then based also on the received transmit antenna height of the WSD. In another embodiment, the information received from the remote entity in step 530 also indicates a receiver antenna height, and the determined propagation path loss is based also on the receiver antenna height. The last step of allocating 550 the channel and a transmit power to the WSD based on the derived constraint is the same as the one described with reference to FIG. 4a.

Figure 5A:
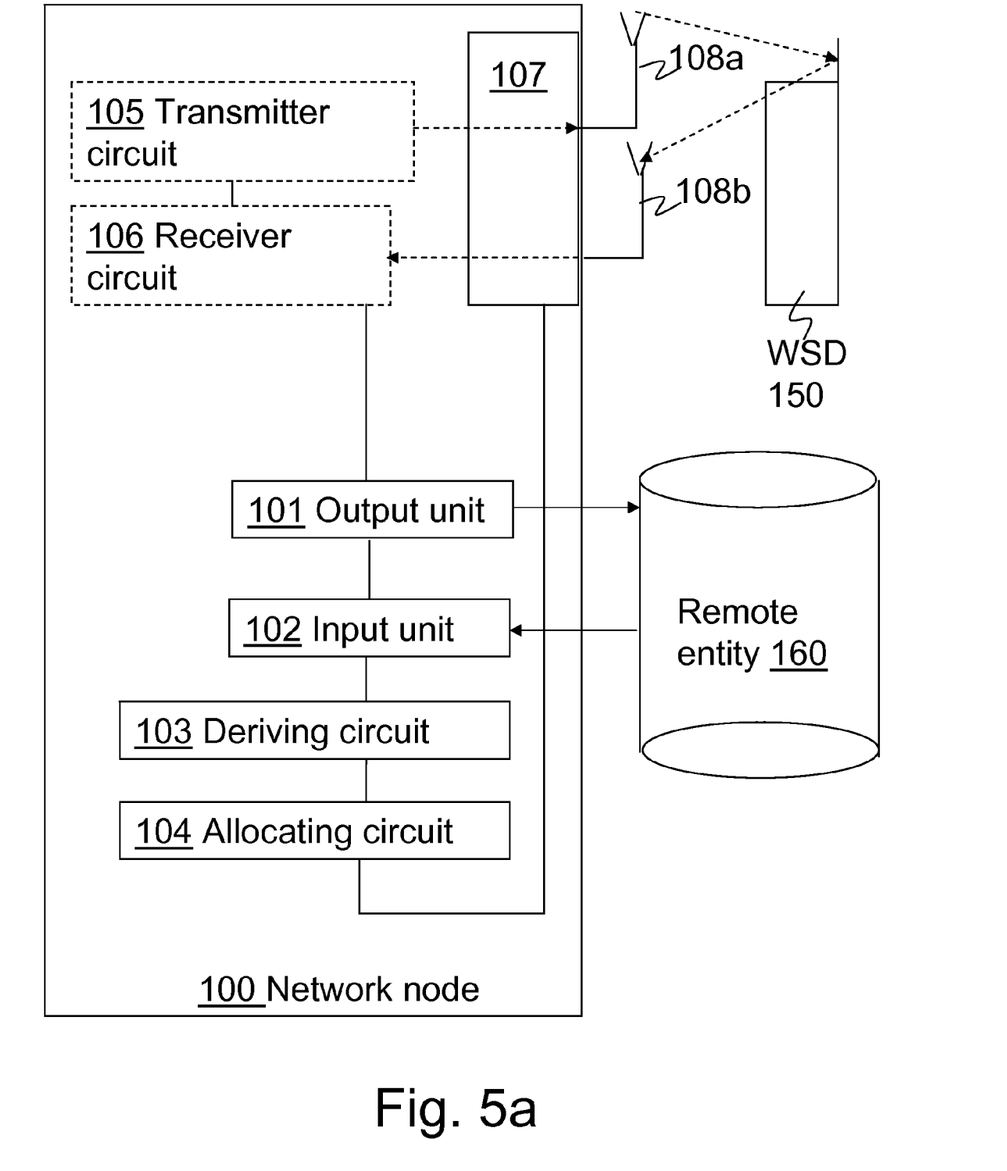
FIGS. 5a-5b are block diagrams illustrating the network node according to embodiments.

The network node 100 is schematically illustrated in FIG. 5a according to embodiments. The network node 100 is configured to be used in a wireless network, and to control interference generated by one or more WSDs 150 controlled by the network node 100. The network node 100 is connectable to a remote entity 160 handling information regarding channels available for secondary usage. The network node may be a master WSD, and the remote entity may be a geo-location database. The network node comprises an output unit 101 adapted to transmit a request for information regarding channels available for secondary usage to the remote entity 160, and an input unit 102 adapted to receive information from the remote entity 160. The information indicates a channel available for secondary usage, a critical position associated with the channel, and an interference threshold for the critical position. The network node also comprises a deriving circuit 103 adapted to derive a constraint for the allocation of the channel to the WSD 150, based on a position of the at least one white space device, the critical position, and the interference threshold. The position of the WSD is in one embodiment obtained from the WSD. Alternatively, the position may be obtained from a memory in the network node, or through a network based positioning method. The constraint comprises a transmit power constraint in one embodiment. In a further embodiment, the deriving circuit 103 is further adapted to calculate a distance between the position of the WSD and the critical position, determine a propagation path loss based on the calculated distance and a pre-defined propagation path loss model, and derive the constraint based on the determined propagation path loss and the interference threshold.

Furthermore, the network node 100 comprises an allocating circuit 104 adapted to allocate said channel and a transmit power to the WSD 150 based on the derived constraint, whereby the interference generated in the critical position by the at least one white space device is kept below the interference threshold.

The network node 100 may comprise a conventional communication unit 107 designed to communicate with the WSD 150 via transmit and receive antennas 108a, 108b. The communication unit 107 informs the WSD about the channel and power allocation and communicates useful data to and from the WSD.

In a further embodiment, the network node also comprises a transmitter circuit 105 and a receiver circuit 106 adapted to respectively request and receive a parameter relevant to the pre-defined propagation path loss model from the WSD. This may then also be done via the communication unit 107 and the antennas 108a, 108b. The deriving circuit 103 is in this embodiment further adapted to determine the propagation path loss based also on the received parameter. The received parameter may be a transmit antenna height of the WSD. The input unit 102 may be further adapted to receive information from the remote entity also indicating a receiver antenna height, and the deriving circuit 103 may be further adapted to determine the propagation path loss based also on the receiver antenna height.

The units and circuits described above with reference to FIG. 5a are logical units and circuits and do not necessarily correspond to separate physical units and circuits.

Figure 5B:
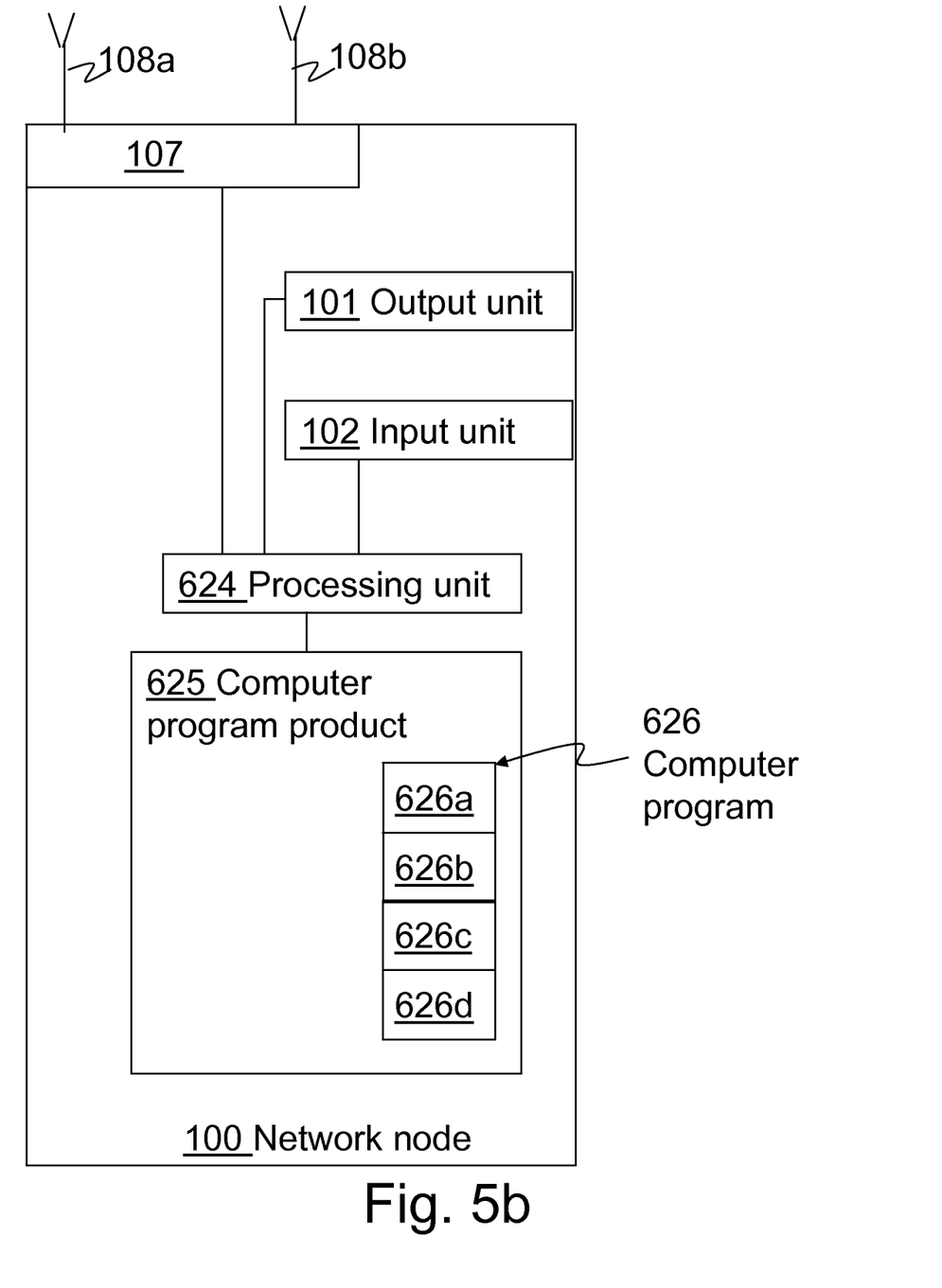

FIG. 5b schematically illustrates an embodiment of the network node 100, which is an alternative way of disclosing the embodiment illustrated in FIG. 5a. The network node 100 comprises the output and input units 101, 102 for receiving and transmitting information from/to the remote entity 160, and the communication unit 107 and antennas 108a, 108b as already described above. The network node 100 also comprises a processing unit 624 which may be a single unit or a plurality of units. Furthermore, the network node 100 comprises at least one computer program product 625 in the form of a non-volatile memory, e.g. an EEPROM (Electrically Erasable Programmable Read-Only Memory), a flash memory or a disk drive. The computer program product 625 comprises a computer program 626, which comprises code means which when run on the network node 100 causes the processing unit 624 on the network node 100 to perform the steps of the procedures described earlier in conjunction with FIG. 4b.

Hence in the embodiments described, the code means in the computer program 626 of the network node 100 comprises a deriving module 626a for deriving a constraint for the allocation of the channel to the WSD, and an allocating module 626b for allocating the channel and a transmit power to the WSD based on the derived constraint. It may also comprise a transmit module 626c and a receive module 626d for respectively requesting and receiving the parameter relevant to the pre-defined propagation path loss model from the WSD. The code means may thus be implemented as computer program code structured in computer program modules. The modules 626a-d essentially perform the steps of the flow in FIG. 4b to emulate the network node described in FIG. 5a. In other words, when the different modules 626a-d are run on the processing unit 624, they correspond to the units 103, 104, 105, and 106 of FIG. 5a.

Although the code means in the embodiment disclosed above in conjunction with FIG. 5b are implemented as computer program modules which when run on the network node 100 causes the node to perform steps described above in the conjunction with FIG. 4b, one or more of the code means may in alternative embodiments be implemented at least partly as hardware circuits.

The above mentioned and described embodiments are only given as examples and should not be limiting. Other solutions, uses, objectives, and functions within the scope of the accompanying patent claims may be possible.

Abbreviations
3GPP 3rd Generation Partnership Program
CR Cognitive Radio
EIRP Equivalent Isotropic Radiated Power
eNB Evolved Node B
E-UTRAN Evolved UTRAN
GSM Global system for Mobile communication
LTE Long Term Evolution
RAN Radio Access Network
RBS Radio Base Station
UE User Equipment
UMTS Universal Mobile Telecommunications System
UTRAN Universal Terrestrial RAN
WSD White Space Device

The invention claimed is:

1. A method for controlling interference generated by a white space device, the method comprising:
transmitting a request for information regarding channels available for secondary usage, from a network node of a wireless network, to a remote entity;
receiving, by the network node, from the remote entity, information indicating a channel available for secondary usage, a critical position associated with said channel, and an interference threshold for the critical position;
deriving, by the network node, a constraint related to allocating said channel to at least one white space device, based on a position of the at least one white space device, the critical position, and the interference threshold; and
allocating, by the network node, said channel and a transmit power to the at least one white space device based on the derived constraint, such that an interference generated in the critical position by the at least one white space device does not exceed the interference threshold,
wherein the critical position corresponds to locations near a primary protection zone where communications of the at least one white space device using the channel to which the critical position is associated, interfere with communications in the primary protection zone.

2. The method according to claim 1, wherein the constraint comprises a transmit power constraint.

3. The method according to claim 1, wherein the deriving comprises:
calculating a distance between the position of the at least one white space device and the critical position,
determining a propagation path loss based on the calculated distance and a pre-defined propagation path loss model, and
deriving the constraint based on the determined propagation path loss and the interference threshold.

4. The method according to claim 3, further comprising requesting and receiving a parameter relevant to the pre-defined propagation path loss model from the at least one white space device, and wherein the determined propagation path loss is based also on the received parameter.

5. The method according to claim 4, wherein the received parameter relevant to the pre-defined propagation path loss model is a transmit antenna height of the at least one white space device.

6. The method according to claim 3, wherein the information received from the remote entity also indicates a receiver antenna height, and wherein the determined propagation path loss is based also on the receiver antenna height.

7. The method according to claim 1, wherein the position of the at least one white space device is obtained from the at least one white space device.

8. The method according to claim 1, wherein the position of the at least one white space device is obtained from a memory in the network node.

9. The method according to claim 1, wherein the position of the at least one white space device is obtained through a network based positioning method.

10. The method according to claim 1, wherein the network node is a master white space device.

11. The method according to claim 1, wherein the remote entity is a geo-location database.

12. A network node configured to be used in a wireless network to control interference generated by a white space device controlled by the network node, the network node comprising:
- an output unit configured to transmit a request for information regarding channels available for secondary usage to a remote entity handling information regarding channels available for secondary usage;
- an input unit configured to receive, from the remote entity, information indicating a channel available for secondary usage, a critical position associated with said channel, and an interference threshold for the critical position;
- a deriving circuit configured to derive a constraint related to allocating said channel to at least one white space device, based on a position of the at least one white space device, the critical position, and the interference threshold; and
- an allocating circuit configured to allocate said channel and a transmit power to the at least one white space device based on the derived constraint, whereby an interference generated in the critical position by the at least one white space device does not exceed the interference threshold,
- wherein the critical position corresponds to locations near a primary protection zone where communications of the at least one white space device using the channel to which the critical position is associated, interfere with communications in the primary protection zone.

13. The network node according to claim 12, wherein the constraint comprises a transmit power constraint.

14. The network node according to claim 12, wherein the deriving circuit is further adapted to calculate a distance between the position of the at least one white space device and the critical position, determine a propagation path loss based on the calculated distance and a pre-defined propagation path loss model, and derive the constraint based on the determined propagation path loss and the interference threshold.

15. The network node according to claim 14, further comprising a transmitter circuit and a receiver circuit adapted to respectively request and receive a parameter relevant to the pre-defined propagation path loss model from the at least one white space device, and wherein the deriving circuit is further adapted to determine the propagation path loss based also on the received parameter.

16. The network node according to claim 15, wherein the received parameter relevant to the pre-defined propagation path loss model is a transmit antenna height of the at least one white space device.

17. The network node according to claim 14, wherein the input unit is further adapted to receive information from the remote entity also indicating a receiver antenna height, and wherein the deriving circuit is further adapted to determine the propagation path loss based also on the receiver antenna height.

18. The network node according to claim 12, wherein the position of the at least one white space device is obtained from the at least one white space device.

19. The network node according to claim 12, wherein the position of the at least one white space device is obtained from a memory in the network node.

20. The network node according to claim 12, wherein the position of the at least one white space device is obtained through a network based positioning method.

21. The network node according to claim 12, wherein the network node is a master white space device.

22. The network node according to claim 12, wherein the remote entity is a geo-location database.

* * * * *